United States Patent
Dhuyvetter et al.

(10) Patent No.: US 8,502,587 B2
(45) Date of Patent: Aug. 6, 2013

(54) FAST RECOVERY VOLTAGE REGULATOR

(75) Inventors: Timothy Alan Dhuyvetter, Arnold, CA (US); Brian Ben North, Santa Clara, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 730 days.

(21) Appl. No.: 12/644,669

(22) Filed: Dec. 22, 2009

(65) Prior Publication Data

US 2011/0148386 A1 Jun. 23, 2011

(51) Int. Cl.
*H03H 11/26* (2006.01)

(52) U.S. Cl.
USPC ............ 327/265; 327/538; 327/539; 327/540

(58) Field of Classification Search
USPC ................. 327/148, 157, 530, 538–543, 546; 323/312–317; 363/59, 60
See application file for complete search history.

(56) References Cited

U.S. PATENT DOCUMENTS

| | | | | |
|---|---|---|---|---|
| 6,806,728 B2* | 10/2004 | Nguyen et al. | ................. | 326/30 |
| 7,042,281 B2* | 5/2006 | Baglin et al. | .................. | 327/541 |
| 7,342,389 B1* | 3/2008 | Wu et al. | ....................... | 323/288 |
| 7,570,035 B2* | 8/2009 | Kleveland | ...................... | 323/276 |
| 2003/0107428 A1* | 6/2003 | Khouri et al. | ................ | 327/536 |
| 2007/0069801 A1* | 3/2007 | Ragone et al. | ................ | 327/536 |
| 2008/0304349 A1* | 12/2008 | Suzuki et al. | ................ | 365/226 |
| 2009/0016084 A1* | 1/2009 | Trattler | .......................... | 363/60 |
| 2009/0066408 A1* | 3/2009 | Fujiwara | ....................... | 327/536 |
| 2009/0184697 A1* | 7/2009 | Park | ............................. | 323/280 |

* cited by examiner

*Primary Examiner* — Lincoln Donovan
*Assistant Examiner* — Brandon S Cole
(74) *Attorney, Agent, or Firm* — Schwegman Lundberg & Woessner P.A.

(57) ABSTRACT

This document discusses, among other things, a voltage regulator having a plurality of switching devices, coupled in parallel, and configured to selectively provide a variable available drive current using a comparison of a regulated Dc output voltage to at least one reference voltage.

20 Claims, 3 Drawing Sheets

FAST RECOVERY VOLTAGE REGULATOR

BACKGROUND

Many direct current (DC) powered devices require a regulated DC power supply at a particular voltage or set of voltages for operation. Power sources such as alternating current (AC) line power or DC battery power, however, may not provide power that is sufficiently regulated for direct use by sensitive electronics. Moreover, many electronics operate at power levels different than those provided by the power sources.

To remedy this situation, voltage regulators can be used to convert power from a power source into regulated power of the proper voltage for a particular electronic device. In certain examples, a voltage regulator can be incorporated into a powered device, or can be a separate unit between the powered device and the power source. Many modern electronic devices use multiple voltage regulators to provide power at different levels for use by various components throughout the device.

A linear voltage regulator is one type of voltage regulator. Linear voltage regulators (also referred to herein as "linear regulators") can be used to convert a range of voltages above a desired voltage into the desired voltage, such as by passing the voltage through an active device (e.g. transistor) and burning off the "unwanted" voltage as heat. Although linear regulators can regulate output voltages with specificity and low ripple, linear regulators can have relatively low bandwidth compared to other voltage regulators.

OVERVIEW

This document discusses, among other things, a voltage regulator having a plurality of switching devices, coupled in parallel, and configured to selectively provide a variable available drive current for a regulated DC output voltage using a comparison of the regulated DC output voltage to at least one reference voltage. In an example, the plurality of switching devices are configured to provide the variable drive current depending on a selected at least one of the plurality of switching devices. A logic circuit can be configured to select at least one of the plurality of switching devices to provide the variable available drive current for the regulated DC output voltage. The logic circuit can be configured to select the at least one of the plurality of switching devices using at least one feedback signal. The at least one feedback signal can be provided using at least one comparator configured to compare the regulated DC output voltage to at least one reference voltage.

In Example 1, a voltage regulator includes a plurality of switching devices coupled in parallel and configured to receive an input voltage and to selectively provide a variable available drive current for a regulated DC output voltage, a first comparator configured to compare the regulated DC output voltage to a first reference voltage and to provide a first feedback signal using the comparison, a second comparator configured to compare the regulated DC output voltage a second reference voltage and to provide a second feedback signal using the comparison, and a logic circuit configured to select at least one of the plurality of switching devices to provide the variable available drive current using the first and second feedback signals from the first and second comparators, wherein the variable available drive current is configured to vary depending on the selected at least one of the plurality of switching devices.

In Example 2, the plurality of switching devices of Example 1 optionally include a first switching device configured to provide a first available drive current and a second switching device configured to provide a second available drive current, wherein the first available drive current substantially corresponds to the second available drive current.

In Example 3, the logic circuit of any one or more of Examples 1-2 is optionally configured to increase the variable available drive current by increasing the number of selected switching devices.

In Example 4, the logic circuit of any one or more of Examples 1-3 is optionally configured to decrease the variable available drive current by decreasing the number of selected switching devices.

In Example 5, the plurality of switching devices of any one or more of Examples 1-4 optionally include a first switching device configured to provide a first available drive current and a second switching device configured to provide a second available drive current, wherein the first available drive current is greater than the second available drive current.

In Example 6, the logic circuit of any one or more of Examples 1-5 is optionally configured to increase the available drive current by selecting the first switching device to provide the variable available drive current instead of the second switching device.

In Example 7, the first reference voltage and second reference voltage of any one or more of Examples 1-6 optionally include bounds for the regulated DC output voltage and the first reference voltage is higher than the second reference voltage, wherein the first comparator is optionally configured to provide a high signal when the regulated DC output voltage is above the first reference voltage, and wherein the logic circuit is optionally configured to change the selected at least one of the plurality of switching devices to decrease the available drive current in response to the high signal.

In Example 8, the logic circuit of any one or more of Examples 1-7 is optionally configured to provide a plurality of digital control signals configured to select the at least one of the plurality of switching devices using the first and second feedback signals.

In Example 9, the plurality of switching devices of any one or more of Examples 1-8 optionally include binary devices having an ON state and an Off state, the binary devices configured to provide a discrete magnitude of available drive current in the ON state and an insignificant magnitude of available drive current in the OFF state.

In Example 10, the first comparator of any one or more of Examples 1-9 is optionally configured to provide a high signal when the regulated DC output voltage is above the first reference voltage and to provide a low signal when the regulated DC output voltage is below the second reference voltage, wherein the second comparator is optionally configured to output a high signal when the regulated DC output voltage is below the second reference voltage and to provide a low signal when the regulated DC output voltage is above the second reference voltage.

In Example 11, a method for providing a regulated DC output voltage includes receiving an input voltage at a plurality of switching devices, providing a regulated DC output voltage and a variable available drive current using at least one of the plurality of switching devices, comparing the regulated DC output voltage to at least one reference voltage and providing a feedback signal using the comparison, and selecting the at least one of the plurality of switching devices using the feedback signal, wherein the variable available drive current varies depending on the selected at least one of the plurality of switching devices.

In Example 12, the comparing the regulated DC output voltage to at least one reference voltage of any one or more of Examples 1-11 optionally includes comparing the regulated DC output voltage to a first reference voltage and providing a first feedback signal using the comparison to the first reference voltage, and comparing the regulated DC output voltage to a second reference voltage and providing a second feedback signal using the comparison to the second reference voltage, the second reference voltage lower than the first reference voltage.

In Example 13, the selecting the at least one of the plurality of switching devices of any one or more of Examples 1-12 optionally includes increasing the available drive current when the regulated DC output voltage is below the second reference voltage.

In Example 14, the providing the regulated DC output voltage using the at least one of the plurality of switching devices of any one or more of Examples 1-13 optionally includes using a binary weighted current source, and wherein the increasing the available drive current includes increasing the number of switching devices used to provide the regulated DC output voltage.

In Example 15, the selecting the plurality of switching devices of any one or more of Examples 1-14 optionally includes decreasing the available drive current when the regulated DC output voltage is above the first reference voltage.

In Example 16, the providing the feedback signal of any one or more of Examples 1-15 optionally includes providing a high signal from a comparator when the output voltage is above the at least one threshold and providing a low signal from a comparator when the output voltage is below the at least one threshold.

In Example 17, a circuit for providing a regulated DC output voltage includes a binary weighted current source including a plurality of switching devices coupled in parallel and configured to receive an input voltage, wherein at least one of the plurality of switching devices is configured to provide drive current for a regulated DC output voltage, a first comparator configured to compare the regulated DC output voltage to a first reference voltage and to provide a first feedback signal using the regulated DC output voltage, wherein the first reference voltage includes a desired output voltage, a second comparator configured to compare the regulated DC output voltage to a second reference voltage and to provide a second feedback signal using the regulated DC output voltage, wherein the second reference voltage includes a high output voltage threshold, a third comparator configured to compare the regulated DC output voltage to a third reference voltage and to provide a third feedback signal using the regulated DC output voltage, wherein the third reference voltage includes a low output voltage threshold, and a logic circuit configured to select the at least one of the plurality of switching devices to provide the drive current for the regulated DC output voltage using the first, second, and third feedback signals from the first, second, and third comparators, wherein the drive current is configured to vary depending on the selected at least one of the plurality of switching devices.

In Example 18, the logic circuit of any one or more of Examples 1-17 is optionally configured to hold the selected at least one of the plurality of switching devices to provide the drive current when the first feedback signal indicates that the output voltage is near the desired output voltage.

In Example 19, the logic circuit of any one or more of Examples 1-18 is optionally configured to decrease the number of the selected at least one of the plurality of switching device to decrease the available drive current when the second feedback signal indicates that the output voltage is above the high output voltage threshold.

In Example 20, the logic circuit of any one or more of Examples 1-19 is optionally configured to increase the number of the selected at least one of the plurality of switching devices to increase the available drive current when the second feedback signal indicates that the output voltage is below the low output voltage threshold.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a voltage regulator that can quickly adapt to variations in current draw of a load device. In certain examples, the fast adjustment can increase voltage regulator efficiency, such as by quickly reducing the drive current level when the load demand decreases.

In an example, a voltage regulator can provide a fast response time using a plurality of switching devices coupled in parallel between an input voltage and an output voltage. In certain examples, each of the plurality of switching devices can be configured as a current source to supply the drive current for the output voltage. The plurality of switching devices can be controlled by a digital controller that can select which of the switching devices to use to supply the drive current for the output voltage. By controlling which of the switching devices are used to supply the drive current, the digital controller can adjust the amount of drive current provided to the load coupled to the output voltage. In an example, the controller can update the selection of the switching devices at each clock cycle based on feedback from a plurality of comparators that compare the output voltage to reference voltages. Accordingly, the systems or methods provided herein can provide fast response to an increase or decrease in output voltage by updating at each clock cycle the selection of which of a plurality of switching devices are used to supply drive current to a load device.

Figure 1:
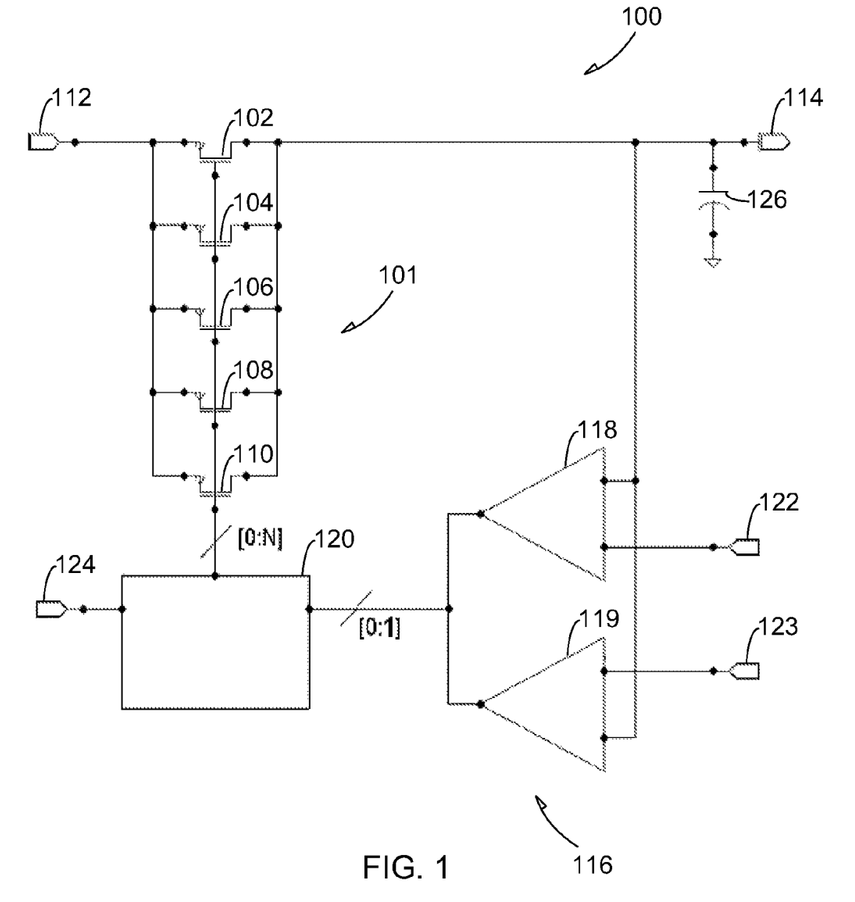
FIG. 1 illustrates generally an example of a circuit configured to provide a regulated output voltage with a fast drive current adjustment.

FIG. 1 illustrates generally an example of a circuit 100 including a plurality of switching devices 101 configured to selectively provide a regulated output voltage with a fast drive current adjustment. In certain examples, the plurality of switching devices 101 can include two switching devices, or more than two switching devices (e.g., a first switching device 102, a second switching device 104, a third switching device 106, a fourth switching device 108, a fifth switching device 110, etc.) configured to convert an input voltage 112 to a regulated output voltage 114. In operation, the circuit 100 can be configured to provide power to a load (not shown) coupled to the regulated output voltage 114.

The circuit 100 can include a feedback loop 116 configured to adjust the plurality of switching devices 101. The feedback loop 116 can include a first comparator 118, a second comparator 119, and a controller 120. In an example, the circuit 100 can include a clock 124 to provide a clock signal for the controller 120. Further, in certain examples, the circuit 100 can include an output capacitor 126 configured to stabilize the regulated output voltage 114.

In certain examples, the plurality of switching devices 101 (e.g., the first switching device 102, the second switching device 104, the third switching device 106, the fourth switching device 108, the fifth switching device 110) can include binary devices having two states, an ON state and an OFF state. The switching devices in the ON state can provide a discrete amount of drive current to the output voltage 114, while the switching devices in the OFF state provides can provide only a insignificant magnitude of drive current to the output voltage 114.

In an example, the plurality of switching devices 101 can include a binary weighted current source. In an example, the binary weighted current source can include a plurality of substantially similar devices configured to provide corresponding magnitudes of drive current for the output voltage 114 when in the ON state. In the example shown in FIG. 1, each of the plurality of switching devices 101 include high side P-channel metal-oxide-semiconductor field-effect transistors (MOSFET) having an output resistance of 2 kOhms. Moreover, in the example shown in FIG. 1, each P-MOS switching device can be set in the ON state by providing sufficient voltage to the gate of the P-MOS switching device, such that the P-MOS switching device operates in saturation. Likewise, each P-MOS switching device can be set in the OFF state by providing sufficiently low voltage to the gate of the P-MOS switching device, such that the P-MOS switching device is in an open state.

Figure 2:
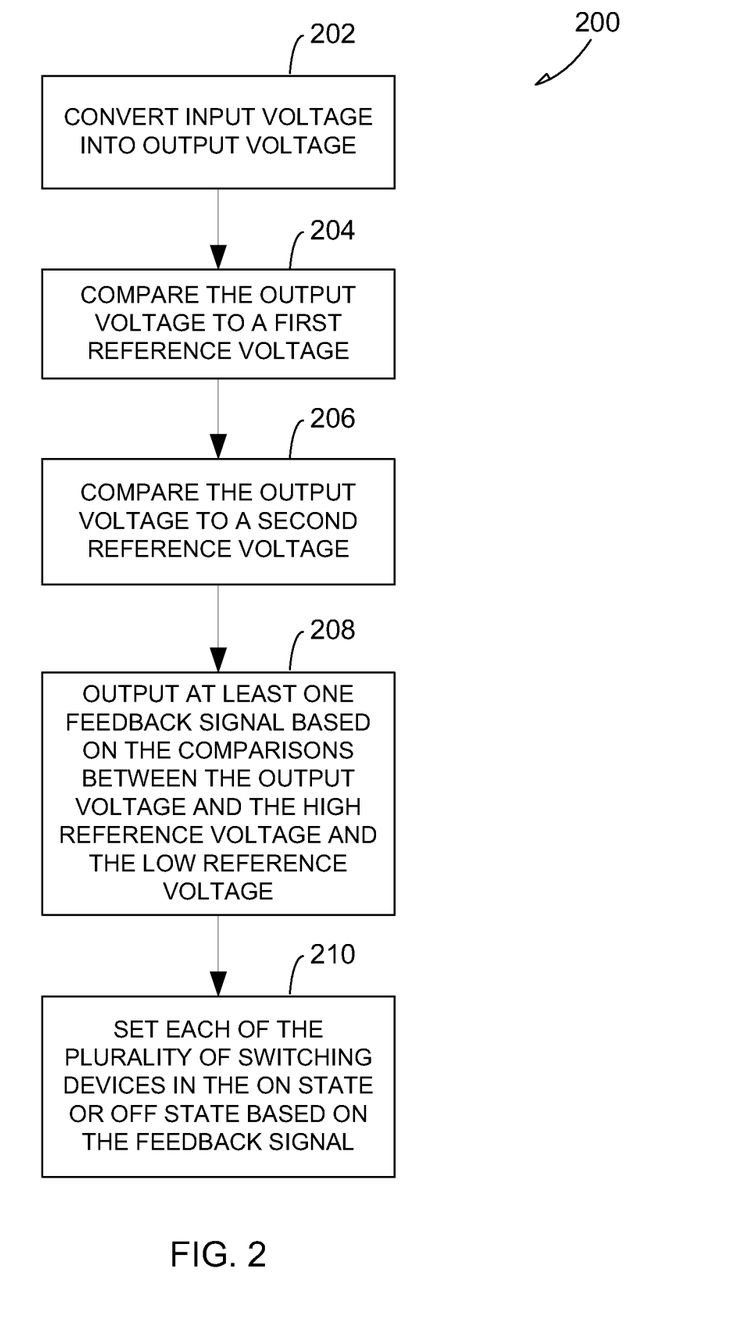
FIG. 2 illustrates generally an example of a method for providing a regulated output voltage.

FIG. 2 illustrates generally an example of a method 200 for providing a regulated output voltage, such as by using the circuit 100 of FIG. 1. The method 200 of FIG. 2 can provide a regulated output voltage by dynamically adjusting the available drive current provided to the output voltage. The drive current can be adjusted using a feedback signal based on comparisons between the output voltage and a first and second reference voltage. More detail regarding the method 200 of FIG. 2 is provided below with reference to the circuit 100 of FIG. 1.

At 202, input voltage (e.g. the input voltage 112) is converted into output voltage (e.g., the output voltage 114). In an example, the plurality of switching devices 101 can receive the input voltage and convert the input voltage 112 into the output voltage 114. Each of the plurality of switching devices 101 can be configured as a current source to selectively supply drive current for a load coupled to the output voltage.

At 204, the output voltage 114 is compared to a first reference voltage 122, and at 206, the output voltage 114 is compared to a second reference voltage 123. In an example, a first comparator 118 can sense the output voltage 114 and compare the output voltage 114 to the first reference voltage 122. A second comparator 119 can also sense the output voltage 114 and compare the output voltage 114 to the second reference voltage 123. In an example, the first comparator 118 can compare the output voltage 114 to a high reference voltage 122. Likewise, the second comparator 119 can compare the output voltage 114 to a low reference voltage 123.

At 208, at least one feedback signal is output based on the comparison between the output voltage 114 and the first reference voltage 122 and the comparison between the output voltage 114 and the second reference voltage 123. In an example, the first and second comparators 118, 119 can provide the at least one feedback signal to the controller 120 based on the comparisons of the output voltage 114 with the high reference voltage 122 and the low reference voltage 123.

In an example, the feedback loop 116 can maintain the output voltage 112 between the high reference voltage 122 and the low reference voltage 123. In certain examples, the high reference voltage 122 and low reference voltage 123 include bounds for the output voltage 114. When the output voltage 112 rises above the high reference voltage 122, the first comparator 118 can output a feedback signal indicating that the output voltage 114 is above the high reference voltage 122. Likewise, when the output voltage 114 rises above the high reference voltage 122, the first comparator 118 can output a feedback signal indicating that the output voltage 114 is above the high reference voltage 122.

In an example, the first comparator 118 can output a digital signal including either a high (e.g. digital "1") or a low (e.g. digital "0") signal to the controller 120. In an example, the first comparator 118 can output a high signal when the output voltage 114 is higher than the high reference voltage 122 and a low signal when the output voltage 114 is lower than a high reference voltage 222. Similarly, in the circuit 100 of FIG. 1, second comparator 119 can output a low signal when the output voltage 114 is higher than the low reference voltage 223 and a high signal when the output voltage 114 is lower than the low reference voltage 223.

At 210, at least one of a plurality of switching devices (e.g. switching devices 101) can be selected to provide the drive current for the output voltage 114 using the feedback signal. In an example, the controller 120 can receive the feedback signals from first comparator 118 and second comparator 119 and can select at least one of the plurality of switching devices 101 to convert the input voltage 112 into the output voltage 114 based on the feedback signal from the first and second comparators 118, 119.

In an example, the controller 120 can select a switching device 101 (e.g. the first switching device 102) for providing drive current to the output voltage 114 by setting the first switching device 102 in the ON state. In an example, when the controller 120 receives a feedback signal from the first comparator 118 indicating that the output voltage 114 is above the high reference voltage 122, the controller 120 can reduce the drive current. Reducing the drive current can, in turn, reduce the output voltage 112. Likewise, when the controller 120 receives a feedback signal from the second comparator 119 indicating that the output voltage 112 is below the low reference voltage 123, the controller 120 can increase the drive current. Increasing the drive current can increase the output voltage 122. The controller 120 can increase and decrease the drive current by controlling which of the plurality of switching devices 101 are selected to convert the input voltage 112 into the output voltage 114. In certain examples, the controller 120 can control whether each of the plurality of switching devices 101 is in the ON or the OFF state in order to control the available magnitude of current that can be provided by the plurality of switching devices 101. By controlling the available magnitude of current sent through the switching devices 101, the controller 120 can control the output voltage 114.

In an example, when the plurality of switching devices 101 are configured as a binary weighted current source, the controller 120 can increase the drive current by increasing the number of switching devices 101 used to convert the input voltage 112 into the output voltage 114. Likewise, to decrease the drive current supplied to the output voltage 114, the controller 120 can decrease the number of switching devices 101.

In an example, each of the switching devices 101 can provide 1 mA of drive current to the output voltage 114. In this example, when the load current draw is low (e.g. less than 1 mA), the first switching device 102 alone can be selected to supply drive current to the output voltage 114, providing 1 mA of available drive current to the output voltage 11; the second, third, fourth, and fifth switching devices 104, 106, 108, 110 are not selected (set in the OFF state) such that the switching devices second, third, fourth, and fifth switching devices 104, 106, 108, 110 supply an insignificant magnitude of drive current to the output voltage 114.

In an example, as the load current draw increases, the load current draw can pull the output voltage 114 down. When the output voltage 114 drops below the low reference voltage, the second comparator 119 can provide a high digital feedback signal to the controller 120. To increase the output voltage 114, the controller 120 can increase the drive current by increasing the number of switching devices 101 used to supply the drive current. Accordingly, when the output voltage 114 drops below the low reference voltage 123, the controller 120 can select the second switching device 104, along with the first switching device 102, to supply the drive current for the output voltage 114. With both the first switching device 102 and the second switching device 104 selected (set in the ON state), 2 mA of drive current can be supplied to the output voltage 114. If the increase to 2 mA is sufficient to increase the output voltage 114 above the low reference voltage, the controller 120 can maintain the selection of the first switching device 102 and the second switching device 104 for supplying the drive current. If, however, the output voltage 114 remains below the low reference voltage, the controller 120, can also select the third switching device 106 to further increase the drive current to 3 mA.

In another example, when the load current draw decreases, the excess drive current can cause the output voltage 114 to increase. When the output voltage 114 rises above the high reference voltage 122, the first comparator 118 provides a high feedback signal to the controller 120. In response to the high feedback signal, the controller 120 can decrease the number of switching devices 101 selected to provide the drive current. For example, if the first, second, and third switching devices 102, 104, and 106 are selected to supply the drive current and the output voltage 114 rises above the high reference voltage, the controller 120 can change the selection, such that only the first and second switching devices 102, 104 are used to supply the drive current. If the decrease to 2 mA is enough to decrease the output voltage 114, below the low reference voltage, the controller 120 can maintain the selection of the first and second switching devices 102, 104, such that the third, fourth, and fifth switching devices 106, 108, 110 are not selected (in the OFF state). If, however, the output voltage 114 remains above the high reference voltage, the controller 120, can further update the selection such that only the first switching device 102 can be used to supply the drive current.

In this manner, the controller 120 and the plurality of switching devices 101 can control the drive current to maintain the output voltage 114 at a substantially constant level with a varying load current draw. In an example, the circuit 100 can include distinct signal paths between each of the first and second comparator 118, 119 and the controller 120, such that each of the first and second comparator 118, 119 can send a distinct signal to the controller 120. In another example, the circuit 100 can include distinct signal paths between the controller 120 and each of the plurality of switching devices 101. In an example, the controller 120 can control switching devices 101 with a digital signal (e.g. a high or low signal). Thus, the controller 120 can individually select each of the switching devices 101 by individually setting each of the switching devices 101 in the ON state or the OFF state.

In an example, the plurality of switching devices 101 can include a mixture of switching devices providing disparate magnitudes of drive current. For example, a first switching device 102 can be configured to provide a large current, while a second switching device 104 can be configured to provide a small current. In this example, when a large current is desired the controller 120 can be configured to select the first switching device 102 (set in the ON state) and not select the second switching device 104 (set in the OFF state). Likewise, when a smaller current is desired the controller 120 can select the second switching device 104 and not select the first switching device 102. As is evident, a combination of switching devices having corresponding and disparate drive current capabilities can be used to supply drive current to the output voltage 114.

In an example, regardless of the drive current capability of each switching device of the plurality of switching devices 101, the controller 120 can select one or more of the switching device 101 to supply drive current to the output voltage 114 in order to hold the output voltage 114 substantially constant for use as a regulated DC power source.

The speed of adjustment of the drive current provided by the plurality of switching devices 101 is dictated in part by a clock 124 for the controller 120. The controller 120 can include a digital logic circuit that changes state using a clock signal from clock 124. In an example, at each transition of the clock signal from low to high, the controller 120 can receive the feedback signals output by the first and second comparators 118, 119. Based on whether each of the feedback signals is high or low, the controller 120 can output at least one signal to select one or more switching devices 101 (set each of the switching devices 120 in the ON state or the OFF state). Accordingly, the speed at which the drive current and the output voltage 114 can be adjusted is based on the frequency of clock 124. A higher frequency clock 124 can result in more frequent receiving of the digital feedback signals by the controller 120 and more frequent adjustment of the drive current.

Although in the examples provided above, five switching devices 102, 104, 106, 108, 110 are described, in other examples more or less than five switching devices may be used. Increasing the number of switching devices can increase the granularity of the drive current that can be provided by the switching devices.

Figure 3:
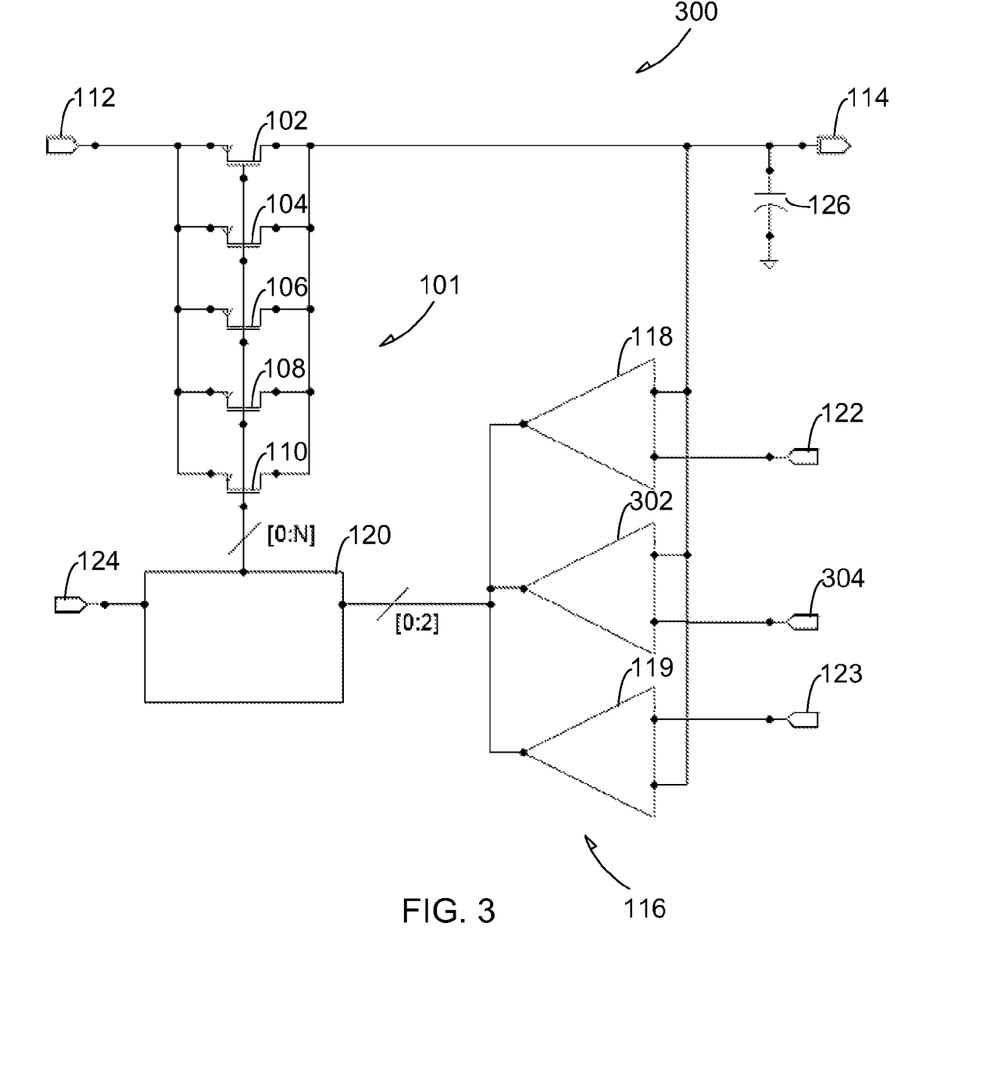
FIG. 3 illustrates generally an example of a circuit configured to provide a regulated DC output voltage.

Referring now to FIG. 3, another example of a circuit 300 for providing a regulated DC output voltage 114 is shown. The circuit 300 of FIG. 3 can include components corresponding to those described in the circuit 100 of FIG. 1. The components of the circuit 300 of FIG. 3 that correspond to components in the circuit 100 of FIG. 1 are shown having the same reference numerals as those used in the circuit 100 of FIG. 1.

The circuit 300 of FIG. 3 can include a plurality of switching devices 101, a first comparator 118, a second comparator 119, a controller 120, and a clock 124. In addition to the first and second comparators 118, 119, the circuit 300 of FIG. 3 also includes a third comparator 302. The third comparator 302 can sense the output voltage 114 and can compare the output voltage 114 to a mid reference voltage 304. In one example, the mid reference voltage 304 can include a desired voltage level for the output voltage 114. In one example, the third comparator 302 can output a high feedback signal when the output voltage 114 is above the mid reference voltage 304 and a low feedback signal when the output voltage 114 is below the mid reference voltage 304. By receiving the feedback signal from the third comparator 302, the controller 120 can estimate when the output voltage 114 is near the mid reference voltage 114. In one example, the controller 120 can estimate when the output voltage 114 is near the mid reference voltage 304 based on when the third comparator 302 switches between the high and low feedback signal. When the controller 120 determines that the output voltage 114 is near the mid reference voltage 304, the controller 120 can maintain the current settings of the plurality of switching devices 101. In this way, the third comparator 302 aids in reducing output ripple and noise in the output voltage 114.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein the terms "higher", "greater", "lower" and "less" with regards to voltage levels relate to the absolute value of a voltage relative to a ground voltage. For example, a +3 voltage is greater than a +2 voltage and a −3 voltage is greater than a −2 voltage.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A voltage regulator comprising:
   a plurality of switching devices coupled in parallel and configured to receive an input voltage and to selectively provide a variable available drive current for a regulated DC output voltage;
   a first comparator configured to compare the regulated DC output voltage to a first reference voltage and to provide a first feedback signal using the comparison;
   a second comparator configured to compare the regulated DC output voltage to a second reference voltage and to provide a second feedback signal using the comparison;
   a third comparator configured to compare the regulated DC output voltage to a third reference voltage and to provide a third feedback signal using the comparison; and
   a logic circuit configured to select at least one of the plurality of switching devices to provide the variable available drive current using the first, second, and third feedback signals from the first, second, and third comparators, wherein the variable available drive current is configured to vary depending on the selected at least one of the plurality of switching devices.

2. The voltage regulator of claim 1, wherein the plurality of switching devices include a first switching device configured to provide a first available drive current, a second switching device configured to provide a second available drive current, and a wherein the first available drive current substantially corresponds to the second available drive current.

3. The voltage regulator of claim 2, wherein the logic circuit is configured to increase the variable available drive current by increasing the number of selected switching devices.

4. The voltage regulator of claim 2, wherein the logic circuit is configured to decrease the variable available drive current by decreasing the number of selected switching devices.

5. The voltage regulator of claim 1, wherein the plurality of switching devices include a first switching device configured to provide a first available drive current and a second switching device configured to provide a second available drive current, wherein the first available drive current is greater than the second available drive current.

6. The voltage regulator of claim 1, wherein the logic circuit is configured to increase the available drive current by selecting the first switching device to provide the variable available drive current instead of the second switching device.

7. The voltage regulator of claim 1, wherein the first reference voltage and third reference voltage include bounds for the regulated DC output voltage and the first reference voltage is higher than the third reference voltage; and
   wherein the first comparator is configured to provide a high signal when the regulated DC output voltage is above the first reference voltage; and
   wherein the logic circuit is configured to change the selected at least one of the plurality of switching devices to decrease the available drive current in response to the high signal.

8. The voltage regulator of claim 1, wherein the logic circuit is configured to provide a plurality of digital control signals configured to select the at least one of the plurality of switching devices using the first and second feedback signals.

9. The voltage regulator of claim 1, wherein the plurality of switching devices include binary devices having as ON state and an OFF state, the binary devices configured to provide a discrete magnitude of available drive current in the ON state and an insignificant magnitude of available drive current in the OFF state.

10. The voltage regulator of claim 1, wherein the first comparator is configured to provide a high signal when the regulated DC output voltage is above the first reference voltage and to provide a low signal when the regulated DC output voltage is below the first reference voltage; and
    wherein the second comparator is configured to output a high signal when the regulated DC output voltage is below the second reference voltage and to provide a low signal when the regulated DC output voltage is above the second reference voltage.

11. A method for providing a regulated DC output voltage, the method comprising:
    receiving an input voltage at a plurality of switching devices;
    providing a regulated DC output voltage and a variable available drive current using at least one of the plurality of switching devices;
    comparing the regulated DC output voltage to first, second, and third reference voltages and providing a feedback signal using the comparison; and
    selecting the at least one of the plurality of switching devices using the feedback signal, wherein the variable available drive current varies depending on the selected at least one of the plurality of switching devices.

12. The method of claim 11, wherein the comparing the regulated DC output voltage to at least one reference voltage includes:
    comparing the regulated DC output voltage to a first reference voltage and providing a first feedback signal using the comparison to the first reference voltage;
    comparing the regulated DC output voltage to a second reference voltage and providing a second feedback signal using the comparison to the second reference voltage, the second reference voltage lower than the first reference voltage; and
    comparing the regulated DC output voltage to a third reference voltage and providing a third feedback signal using the comparison to the third reference voltage, the third reference voltage lower than the second reference voltage.

13. The method of claim 11, wherein the selecting the at least one of the plurality of switching devices includes increasing the available drive current when the regulated DC output voltage is below the second reference voltage.

14. The method of claim 13, wherein the providing the regulated DC output voltage using the at least one of the plurality of switching devices includes using a binary weighted current source, and wherein the increasing the available drive current includes increasing the number of switching devices used to provide the regulated DC output voltage.

15. The method of claim 11, wherein the selecting the plurality of switching devices includes decreasing the available drive current when the regulated DC output voltage is above the first reference voltage.

16. The method of claim 11, wherein the providing the feedback signal includes providing a high signal from a comparator when the output voltage is above the at least one threshold and providing a low signal from a comparator when the output voltage is below the at least one threshold.

17. A circuit for providing a regulated DC output voltage, the circuit comprising:
    a binary weighted current source including a plurality of switching devices coupled in parallel and configured to receive an input voltage, wherein at least one of the plurality of switching devices is configured to provide drive current for a regulated DC output voltage;
    a first comparator configured to compare the regulated DC output voltage to a first reference voltage and to provide a first feedback signal using the regulated DC output voltage, wherein the first reference voltage includes a desired output voltage;
    a second comparator configured to compare the regulated DC output voltage to a second reference voltage and to provide a second feedback signal using the regulated DC output voltage, wherein the second reference voltage includes a high output voltage threshold;
    a third comparator configured to compare the regulated DC output voltage to a third reference voltage and to provide a third feedback signal using the regulated DC output voltage, wherein the third reference voltage includes a low output voltage threshold; and
    a logic circuit configured to select the at least one of the plurality of switching devices to provide the drive current for the regulated DC output voltage using the first, second, and third feedback signals from the first, second, and third comparators, wherein the drive current is configured to vary depending on the selected at least one of the plurality of switching devices.

18. The circuit of claim 17, wherein the logic circuit is configured to hold the selected at least one of the plurality of switching devices to provide the drive current when the first feedback signal indicates that the output voltage is near the desired output voltage.

19. The circuit of claim 17, wherein the logic circuit is configured to decrease the number of the selected at least one of the plurality of switching device to decrease the available drive current when the second feedback signal indicates that the output voltage is above the high output voltage threshold.

20. The circuit of claim 17, wherein the logic circuit is configured to increase the number of the selected at least one of the plurality of switching devices to increase the available drive current when the second feedback signal indicates that the output voltage is below the low output voltage threshold.

\* \* \* \* \*